(12) United States Patent
Lechler et al.

(10) Patent No.: US 12,516,677 B2
(45) Date of Patent: Jan. 6, 2026

(54) HYDRAULIC POSITION CONTROL ARRANGEMENT

(71) Applicant: IE ASSETS GMBH & CO. KG, Schorndorf (DE)

(72) Inventors: Markus Lechler, Schorndorf (DE); Samuel Arnold, Shorndorf (DE)

(73) Assignee: IE ASSETS GMBH + CO. KG, Schorndorf (DE)

( * ) Notice: Subject to any disclaimer, the term of this patent is extended or adjusted under 35 U.S.C. 154(b) by 0 days.

(21) Appl. No.: 18/991,595

(22) Filed: Dec. 22, 2024

(65) Prior Publication Data
US 2025/0207607 A1 Jun. 26, 2025

Related U.S. Application Data

(63) Continuation-in-part of application No. PCT/EP2024/025187, filed on Jun. 14, 2024.

(30) Foreign Application Priority Data

Dec. 21, 2023 (DE) ...................... 20 2023 107 588.6

(51) Int. Cl.
  *F04D 29/36* (2006.01)
  *F15B 15/14* (2006.01)
(52) U.S. Cl.
  CPC ........ *F04D 29/362* (2013.01); *F15B 15/1423* (2013.01)
(58) Field of Classification Search
  CPC .......................... F04D 29/362; F15B 15/1423
  See application file for complete search history.

(56) References Cited

U.S. PATENT DOCUMENTS 10,371,180 B2 * 8/2019 Hägele ..................... B63H 3/00
11,248,621 B2 * 2/2022 Erhardt ............... F16L 27/0828
(Continued)

FOREIGN PATENT DOCUMENTS

DE 20 2017 104 188 U1 9/2017
DE 10 2017 105 776 A1 9/2018

OTHER PUBLICATIONS

International Search Report in the German language for the corresponding International Patent Application No. PCT/EP2024/025187 (2 pages); dated Sep. 6, 2024.

(Continued)

*Primary Examiner* — Nathaniel E Wiehe
*Assistant Examiner* — Jason G Davis
(74) *Attorney, Agent, or Firm* — Ronald S. Lombard

(57) ABSTRACT

A hydraulic position control arrangement with a base body which is rotatably supported on a shaft that includes a hydraulic fluid passage for the admission of hydraulic fluid to an operating chamber which is delimited by the base body and an annular piston which is axially movably supported by the base body, includes an annular sealing element disposed in the base body and seated on the shaft and a leakage return path which extends from the area outside the shaft to the operating chamber through the sealing element. The shaft has at least two axial sections with different outside diameters with the sealing element being seated on the axial shaft section of smaller diameter. The sealing element has a seal lip which abuts the outside of the shaft and is axially supported by a support ring which is provided in the base body.

8 Claims, 2 Drawing Sheets

(56) References Cited

U.S. PATENT DOCUMENTS

2016/0153479 A1  6/2016  Hägele et al.
2020/0040905 A1  2/2020  Erhardt et al.

OTHER PUBLICATIONS

English translation of the International Search Report for the corresponding International Patent Application No. PCT/EP2024/025187 (2 pages); dated Sep. 6, 2024.

\* cited by examiner

HYDRAULIC POSITION CONTROL ARRANGEMENT

CROSS-REFERENCE TO RELATED APPLICATIONS

This is a continuation-in-part application of pending international patent application PCT/EP2024/025187 filed Jun. 14, 2024 and claiming the priority of German patent application No. 20 2023 107 588.6 filed Dec. 21, 2023. Both the said international patent application PCT/EP2024/025187 and the said German patent application No. 20 2023 107 588.6 are incorporated herein by reference in their entireties as though fully set forth.

BACKGROUND OF THE INVENTION

The invention resides in a hydraulic position control arrangement according to the preamble of claim 1.

EP 2 923 088 B1 discloses a hydraulic control arrangement with a pot-like base body which is rotatably mounted on a shaft which includes a hydraulic channel for the admission of a hydraulic fluid. The hydraulic channel extends to an operating chamber which is delimited at one side by the base body and, at the opposite side, by an annular piston which is axially movably disposed in the base body. An annular sealing arrangement with two annular seals is disposed on the shaft and delimits a leakage path which extends from the outer side of the shaft to the operating chamber.

DE 20 2017 104 188 U1 discloses a hydraulic control arrangement which may be used in connection with air blower wheels which have blower vanes that extend radially from their hub. The blower vanes are adjustable in their blow direction via the hydraulic control arrangement while the blower maintains the same direction of rotation by pivoting the vanes about their axes. The hydraulic control arrangement comprises a base body which is rotatably supported on a shaft which includes a hydraulic fluid channel for the admission of a hydraulic fluid. The control arrangement comprises further a leakage return passage which extends from the outside of the shaft to the operating chamber to which the hydraulic channel extends.

EP 3 565 974 B1 discloses a hydraulic rotational shaft passage for a blower wheel with fan blades which are adjustable about their longitudinal axis. The hydraulic rotational shaft includes a pressure passage which extends parallel to a rotational neck for the operating fluid and a collection line for possible leakages.

DE 10 2017 105 776 A1 discloses a hydraulic rotational penetration structure with a pressure duct for an operating fluid and a collection line for possible leakages.

It is the object of the present invention to provide a hydraulic control arrangement with high leakage security.

SUMMARY OF THE INVENTION

In accordance with the invention this object is achieved with the features of claim 1. The dependent claims define expedient further embodiments.

Below the term "axial" means in the direction of or parallel to the longitudinal shaft axis which forms the longitudinal and, at the same time the rotational axis of the hydraulic position control arrangement. The term "radial" means orthogonal to the longitudinal shaft axis.

The hydraulic control arrangement according to the invention may be used for example for adjusting the vanes of a blower or a fan wheel which vanes are supported so as to be pivotable about the longitudinal vanes' axes. The hydraulic control arrangement includes a base body which is rotatably supported on a shaft which is provided with a hydraulic channel for the admission of hydraulic fluid. The hydraulic channel extends to an operating chamber of a variable volume which is delimited by the base body and a pot-like annular piston which is axially adjustably supported by the base body. The position of the annular piston in the base body is adjustable by supplying hydraulic fluid to the operating chamber. The movement of the annular piston is transferred to a component which is adjustable from a first state to a second state for example to the fan blade of the fan wheel for moving the blades from a first blade position to a second blade position.

In a preferred embodiment a force is applied to the annular piston in an axial direction toward the base body, in particular via one or several spring elements. When hydraulic fluid is supplied to the working chamber the volume of the working chamber is increased and the annular piston is moved axially against the force of the spring elements.

In addition, the control arrangement includes an annular seal element which is accommodated in the base body supported on the shaft. Furthermore, the control arrangement includes a leakage return passage which extends from the outside of the shaft to the operating chamber, whereby the leakage return passage extends at least partially through the sealing element. Via the leakage return passage hydraulic fluid which leaks from the operating chamber above the outside of the shaft between the shaft and the sealing element can be returned to the operating chamber.

The shaft has at least two axial sections with different outer diameters. The sealing element is seated on the axial section of smaller diameter and a sealing lip of the sealing element abuts the outer side of the shaft. In axial direction, the sealing element is supported by a support ring which is accommodated in the base body. The seal lip of the seal ring may be supported by the support ring.

The arrangement has various advantages: The sealing element is disposed within the base body and rotates together therewith relative to the shaft, whereby, because of the reduced shaft diameter, the circumferential speed of the seal element in the contact area with the shaft is reduced. In this axial section, the shaft diameter is reduced for example by 20% so that, accordingly, also the circumferential speed is reduced by this value with respect to that in the axial section of the shaft with the larger diameter. As a result the stress and the wear of the seal material are reduced and the operating life of the seal element and, as a result, also of the position control arrangement are increased.

It is further advantageous that the sealing element is supported axially by the support ring. Axial forces which act on the seal element are accommodated by the support ring. The seal element is axially engaged between a section of the base body and the support ring and in this way, axially secured. Connections between passages of the leakage return line in the transition to, or respectively, from the seal element are retained with high dimensional accuracy over large operating periods.

The support ring is arranged advantageously axially in the area of the transition shoulder between the shaft sections with different outer diameters. It is expedient that the support ring has an inner diameter that is larger than the outer diameter of the shaft so that a radial space is provided around the shaft. In this way, it is ensured that, upon rotation of the base body and the support ring, there is no frictional contact between the support ring and the outside surface of the shaft.

In accordance with another advantageous embodiment, the seal element abuts axially with its front side facing the operating chamber an elastic tension element which is accommodated in the base body.

The elastic tension element as well as the support ring each can extend only over a part of the radial width of the respective front side of the sealing element. This permits to form the front sides of the sealing element with contoured surface areas with ledges which in each case are supported by the elastic tension element or, respectively, the support ring only in sections.

In accordance with another advantageous embodiment the base body comprises a base body base and a sealing flange which is disposed directly adjacent a fluid receiving area. The base body in this case consists of two parts. This has the advantage that the sealing element can be slid onto the shaft and properly positioned in the sealing flange before a complete assembly of the structure. Then the sealing flange can be fixed to the base body base so that the sealing element is fixed in its final desired position between the base body base and the sealing flange.

The base body includes a bearing arrangement by which the shaft is rotatably supported. For sliding the bearing arrangement onto the shaft it may be expedient to place first a hose-like support device onto the shaft in the area of the reduced-diameter axial section and then slide the seal element onto the shaft in order to avoid damages to the seal seat during the assembly step. When the bearing arrangement is in its desired position on the shaft the hose-like support device can be removed.

The sealing flange may be provided with a threaded section which can be threaded onto a counter thread provided on the base body base. This arrangement has the advantage that no additional mounting elements are required for the connection of the base body base and the sealing flange. It is rather sufficient to screw the sealing flange together with the base body base. The thread section is provided for example on a cylindrical accommodation projection on the sealing flange in the form of an outer thread which is threaded into a corresponding inner thread provided in an opening in the accommodation projection.

In accordance with another advantageous embodiment, the seal flange is provided with a leakage path which is part of the leakage return passage and is in communication with a seal leakage return channel which is also part of the leakage return passage and which extends through the sealing element. In this way, leakage fluid can be conducted from the outside of the shaft via the seal leakage channel in the seal element and the leakage channel in the seal flange back to the operating chamber. The seal leakage channel in the seal element extends preferably radially with respect to the shaft longitudinal axis and the leakage channel in the sealing flange extends axially at least in sections.

In accordance with a further advantageous embodiment, the front end of the shaft ends in the seal flange which is provided with a hydraulic bore which is in alignment with the hydraulic channel in the shaft. Herein, it is particularly expedient that the inner diameter of the hydraulic bore in the sealing flanges has the same size as the inner diameter of the hydraulic channel in the shaft from the shaft up to the hydraulic bore in the sealing flange whereby a continuous fluid low of the hydraulic fluid supply is ensured.

In still a further advantageous embodiment, the outer surface of the shaft is coated with a friction-reducing layer. This reduces the friction between the shaft and the sealing element disposed on the shaft, when rotating relative to the shaft.

The invention also relates to a fan wheel with fan vanes which are supported pivotally about the vane axis where the fan wheel is provided with a control arrangement as described earlier for pivoting the fan vanes. The axial control movement of the annular piston is converted to a pivot movement of the fan vanes. The control arrangement may form the hub of the fan wheel.

Further advantages and expedient embodiments are apparent from the sub-claims, the description of the figures and the drawings.

BRIEF DESCRIPTION OF THE DRAWINGS

It is shown in.

In the figures identical components are designated by the same reference numerals.

DETAILED DESCRIPTION OF THE INVENTION

Figure 1:
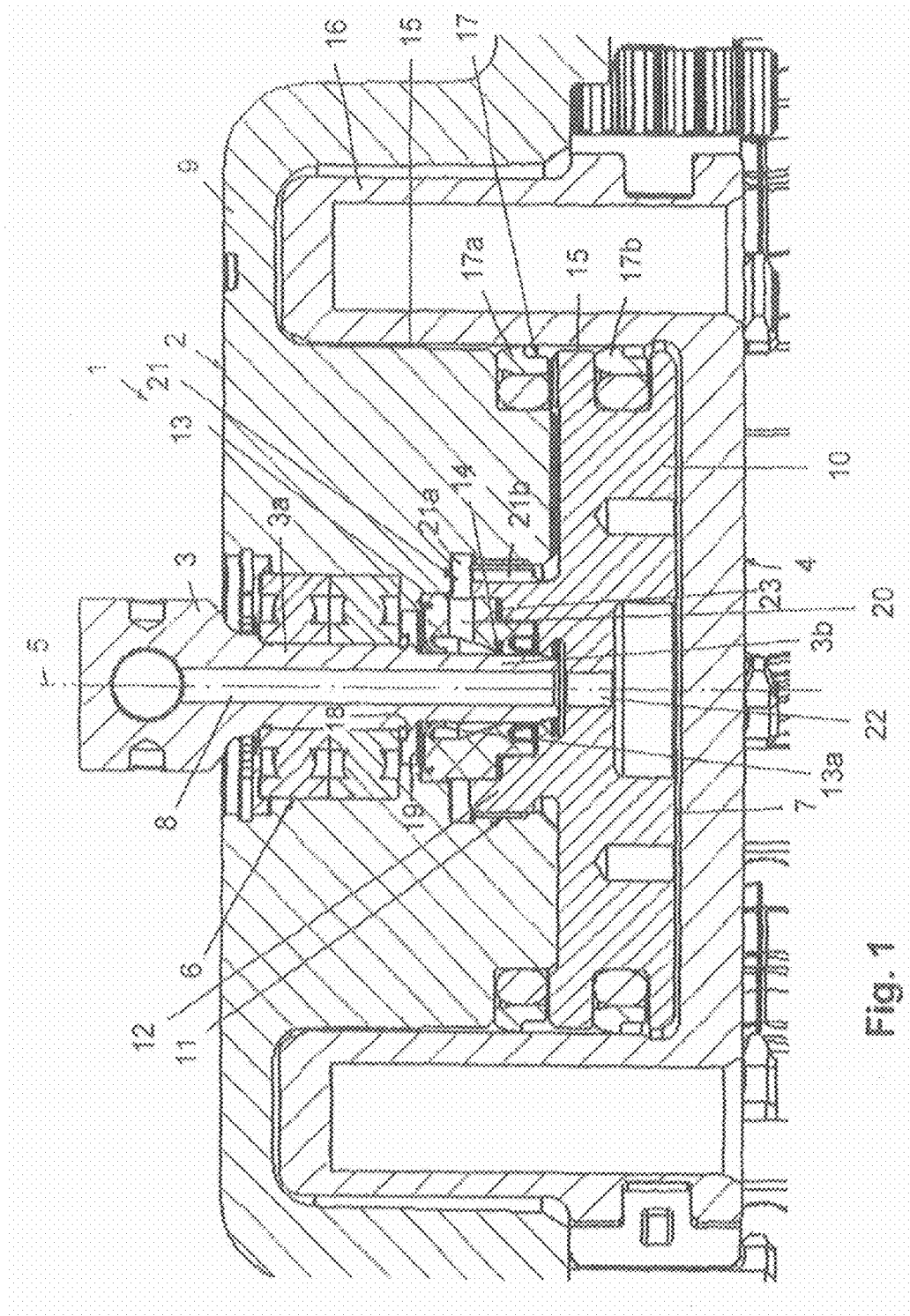
FIG. 1: A hydraulic control arrangement in a longitudinal cross-section with a base body which is rotatably supported on a shaft that includes a hydraulic channel for the admission of hydraulic fluid and is provided with an annular piston which is axially adjustably supported on the base body and has an annular sealing element disposed on the shaft and, FIG. 2: an enlarged section of the area with the sealing element.
Figure 2:
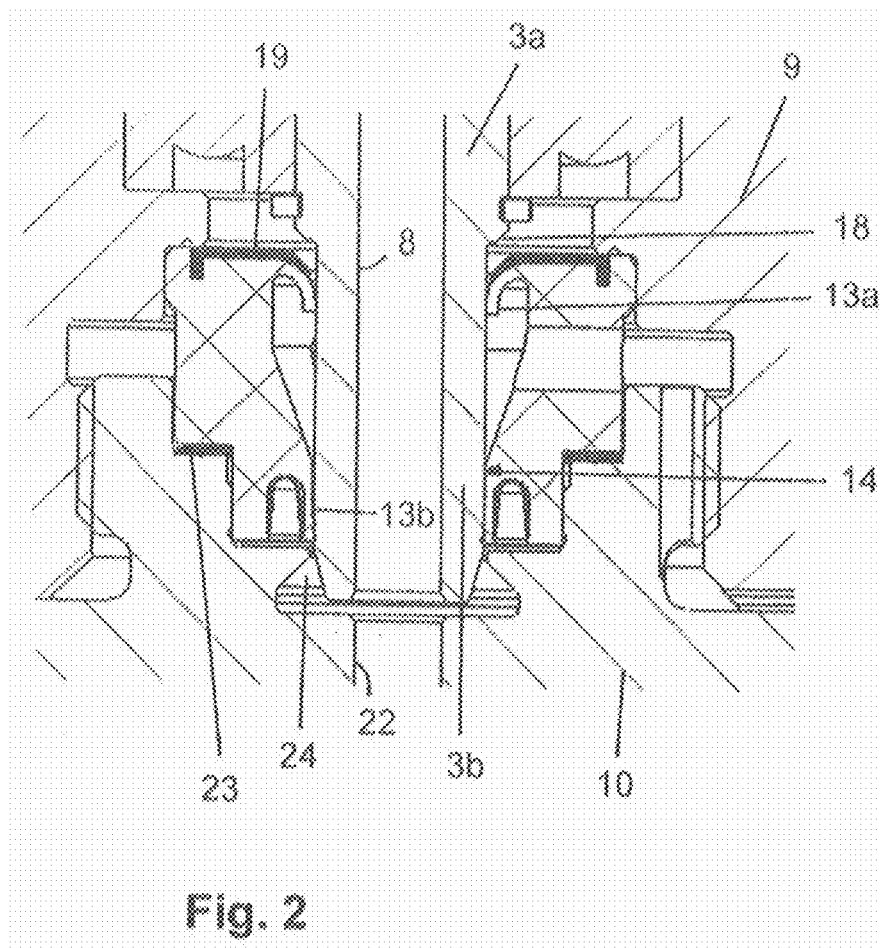

The control arrangement 1 as shown is hydraulically operable and may be used, for example, for adjusting blower or fan vanes which are supported in a blower or fan wheel so as to be pivotable about the longitudinal axis of the vanes, not shown in the drawings. The control arrangement 1 comprises a base body 2, a shaft 3 and an annular piston 4 wherein the shaft 3 is stationary, that is, fixed, and the base body 2 and the annular piston 4 are supported on the shaft 3 so as to be rotatable about the shaft axis 5. This makes it possible to integrate the control arrangement 1 into a hub of a fan, not shown in the drawings, and to supply hydraulic fluid for the actuation of the control arrangement 1 and of the adjustable air vanes of the blower wheel via the stationary shaft 3. For its rotatable support about the longitudinal shaft axis 5 the base body 2 includes a bearing arrangement 6 accommodating the shaft 3.

The annular piston 4 is non-rotatably but axially movably supported on the base body 2 and is biased by spring elements, not shown in the drawings, toward the base body 2. Between the front side of the base body 2 and the facing front side of the annular piston 4 there is an operating chamber 7 with an adjustable volume for receiving hydraulic fluid which is supplied thereto via the shaft 3. The shaft 3 includes a hydraulic channel 8 which extends axially and via which the hydraulic fluid is conducted from without to the operating chamber 7. As the hydraulic fluid enters the operating chamber 7 the volume of the operating chamber 7 is increased as the annular piston 4 is biased axially away from the base body against the force of the spring elements. This movement of the annular piston 4 is used as adjustment movement for example for the position adjustment of the vane blades of a fan wheel.

The base body 2 comprises two parts that is a base body base 9 and a sealing flange 10 whose front side delimits the operating chamber 7 and faces the front side of the adjacent annular piston 4 which forms a further delimiting surface for the operating chamber 7. The sealing flange 10 is connected to the base body base 9 by a thread connection 11. To this end, the sealing flange 10 is provided with an externally threaded section formed on an annular axial extension 12 of the sealing flange 10 which annular extension 12 is internally threaded and is threaded onto the base body base 9.

The sealing flange 10 has an axial opening for accommodating the shaft 3. The front end of the shaft 3 ends in the sealing flange 10 which is provided with a hydraulic bore 22 which extends coaxially with the hydraulic channel 8 in the shaft 3. The internal diameter of the hydraulic bore 22 in the sealing flange 10 is the same as the internal diameter of the hydraulic channel 8 in the shaft 3 so that a continuous flow path without diameter changes from the shaft 3 up to the hydraulic bore 22 in the sealing flange 10 is provided and a continuous flow of the hydraulic fluid is ensured. The accommodation passage for receiving the shaft 3 has in the transition area to the hydraulic bore 22, which has a smaller diameter than the accommodation passage 1, an annular dirt collection groove 24. The dirt collection groove 24 has a larger diameter than the accommodation passage.

In a recess of the axial receiving extension 12, an annular sealing element 13 is axially supported into which the shaft 3 is inserted. The outer surface of the shaft 3 is coated with a friction-reducing coating so that rotation of the sealing element around the shaft 3 is possible with little friction. The sealing element 13 is disposed in a first leakage path 14 which extends from the outside of the shaft 3 to the operating chamber 7 and via which any leakage of hydraulic fluid, which escapes axially along the outer shaft wall from the operating chamber 7 is again returned to the operating chamber 7. A second leakage path 15 extends from the operating chamber 7 between an inner wall of an annular projection 16 of the annular piston 4 and an adjacent wall of the base body base 9 and the sealing flange 10. The second leakage path is provided with a sealing arrangement 17 with two individual annular seals 17a, 17b disposed in the base body base 9 and in the sealing flange 10. The sealing arrangement 17 has a hydraulic fluid back pumping effect for returning leakage back to the operating chamber 7.

The shaft 3 includes several axial sections with different outer diameters. An axial section 3a of the shaft 3 with larger outer diameter extends into the base body base 9 whereas an adjacent axial section 3b with smaller outer diameter extends into the sealing flange 10. Between the axial sections 3a, 3b an annular transition shoulder 18 is formed on the shaft 3.

The seal element 13 is seated on the axial section 3b of smaller diameter and a seal lip 13a of the seal element 13 abuts the outer side of the shaft and delimits the first leakage path 14. The seal element 13 including the seal lip 13a are supported axially at the side facing away from the operating chamber 7 on a support ring 19 which is accommodated in the base body base 9 and is supported thereby. The internal diameter of the support ring 19 is larger than the outer diameter of the shaft 3 and is disposed at the radial distance from the outside wall of the shaft so that friction between the support ring 19 and the shaft surface is avoided.

The seal lip 13a of the seal element 13 delimits the leakage path 14 at the low pressure side. A second seal lip 13b of the seal element 13 which is arranged axially spaced from the first seal lip 13a closer to the operating chamber 7 delimits the leakage path 14 at the high pressure side.

At its front side facing the operating chamber 1 the seal element 13 abuts an annular spring element 23 which is accommodated in the sealing flange 10.

A leakage return path for returning leakage fluid from outside the shaft 3 to the operating chamber 7 comprises a radial seal leakage passage 20 in the seal element 13 and a leakage passage 21 next to the seal leakage passage 20 in the sealing flange 10. The leakage channel 21 includes an annular receiving chamber 21a which extends radially outwardly from the seal leakage passage 20 in the seal element 13 and, distributed over the circumference, several axial bores 21b, which extend from the annular receiving chamber 21a to the area between the base body base 9 and the sealing flange 10. The two annular seals of the sealing arrangement 17 are disposed axially below and above the area between the base body base 9 and the sealing flange 10.

The seal lip 13a of the seal element 13 prevents leaking fluid coming from the operating chamber 7 along the shaft from flowing beyond the seal element 13. The seal lip 13a directs the leaking fluid radially outwardly into the radial seal leakage passage 20 in the seal element 13 which is supported by the rotation of the base body 2 and the annular piston 4.

From the seal leakage passage 20 the leaking fluid is moved further radially outwardly into the surrounding annular receiving chamber 21a and, further, via the bores 21b, axially downwardly into the area between the base body base 9 and the sealing flange 10. From here the leaking fluid passes the seal arrangement 17 and returns to the operating chamber 7.

LIST OF REFERENCE NUMERALS 1 base body control arrangement
2 base body
3 shaft
3a axial section of shaft
3b axial section of shaft
4 annular piston
5 shaft axis
6 bearing arrangement
7 operating chamber
8 hydraulic channel
9 base body base
10 sealing flange
11 thread connection
12 annular axial extension
13 seal element
13a seal lip
13b seal lip
14 first leakage path
15 second leakage path
16 annular projection
17 sealing arrangement
17a annular seal
17b annular seal
18 transition shoulder
19 supporting ring
20 seal leakage passage
21 leakage passage
21a receiving chamber
21b axial base
22 hydraulic bore
23 spring element
24 annular dirt collection groove

What is claimed is:

1. A hydraulic position control arrangement comprising a base body (2) rotatably supported on a shaft (3) which includes a hydraulic channel (8) for the admission of hydraulic fluid to an operating chamber (7) which is delimited by the base body (2) and an annular piston (4) which is axially adjustably supported on the base body (2), an annular seal element (13) disposed on the shaft (3) within the base body (2) and with a leakage return path extending from the outside area of the shaft to the operating chamber (7), wherein the leakage return path extends through the annular seal element (13) and the shaft (3) has at least two axial sections (3a, 3b) of different outside diameters and the annular seal element (13) is seated on the axial section (3b) of smaller diameter, characterized by, the seal element (13) is axially supported by a support ring (19) provided in the base body (2) and has a seal lip (13a) which abuts the outside of the shaft (3), wherein the base body (2) includes a base body base (9) and a sealing flange (10) disposed directly adjacent the operating chamber (7), and wherein the sealing flange (10) is provided with a threaded section (11) threaded into a counter thread provided on the base body base (9).

2. The position control arrangement according to claim 1, wherein the sealing flange (10) includes a leakage passage (21) which is part of the leakage return path.

3. The position control arrangement according to claim 1, wherein the inner diameter of the support ring (19) is larger than the outer diameter of the shaft (3) and the support ring is arranged on the shaft (3) with radial spacing from the outside of the shaft (3).

4. A fan wheel with fan blades which are supported pivotally about the longitudinal blade axes with a fan blade position control arrangement (1) according to claim 1 for pivoting the fan blades.

5. A hydraulic position control arrangement comprising a base body (2) rotatably supported on a shaft (3) which includes a hydraulic channel (8) for the admission of hydraulic fluid to an operating chamber (7) which is delimited by the base body (2) and an annular piston (4) which is axially adjustably supported on the base body (2), an annular seal element (13) disposed on the shaft (3) within the base body (2) and with a leakage return path extending from the outside area of the shaft to the operating chamber (7), wherein the leakage return path extends through the annular seal element (13) and the shaft (3) has at least two axial sections (3a, 3b) of different outside diameters and the annular seal element (13) is seated on the axial section (3b) of smaller diameter, characterized by, the seal element (13) is axially supported by a support ring (19) provided in the base body (2) and has a seal lip (13a) which abuts the outside of the shaft (3), wherein the base body (2) includes a base body base (9) and a sealing flange (10) disposed directly adjacent the operating chamber (7), wherein the shaft (3) has a front section (3b) that ends in the sealing flange (10) which is provided with a hydraulic bore (22) which is in alignment with the hydraulic channel (8), and, wherein the inner diameter of the hydraulic bore (22) in the sealing flange (10) is the same as that of the hydraulic channel (8) in the shaft (3).

6. A hydraulic position control arrangement comprising a base body (2) rotatably supported on a shaft (3) which includes a hydraulic channel (8) for the admission of hydraulic fluid to an operating chamber (7) which is delimited by the base body (2) and an annular piston (4) which is axially adjustably supported on the base body (2), an annular seal element (13) disposed on the shaft (3) within the base body (2) and with a leakage return path extending from the outside area of the shaft to the operating chamber (7), wherein the leakage return path extends through the annular seal element (13) and the shaft (3) has at least two axial sections (3a, 3b) of different outside diameters and the annular seal element (13) is seated on the axial section (3b) of smaller diameter, characterized by, the seal element (13) is axially supported by a support ring (19) provided in the base body (2) and has a seal lip (13a) which abuts the outside of the shaft (3), wherein the seal element (13) on the front side facing the operating chamber (7), abuts a spring element (23) which is accommodated in the seal flange (10).

7. The position control arrangement according to claim 6, wherein the seal element (13) is provided with a seal leakage passage (20) which extends radially with respect to the shaft axis (5) and is part of the leakage return path.

8. A hydraulic position control arrangement comprising a base body (2) rotatably supported on a shaft (3) which includes a hydraulic channel (8) for the admission of hydraulic fluid to an operating chamber (7) which is delimited by the base body (2) and an annular piston (4) which is axially adjustably supported on the base body (2), an annular seal element (13) disposed on the shaft (3) within the base body (2) and with a leakage return path extending from the outside area of the shaft to the operating chamber (7), wherein the leakage return path extends through the annular seal element (13) and the shaft (3) has at least two axial sections (3a, 3b) of different outside diameters and the annular seal element (13) is seated on the axial section (3b) of smaller diameter, characterized by, the seal element (13) is axially supported by a support ring (19) provided in the base body (2) and has a seal lip (13a) which abuts the outside of the shaft (3), wherein the surface of the shaft (3) has a friction reducing coating.

\* \* \* \* \*